(12) United States Patent
King

(10) Patent No.: US 9,306,995 B2
(45) Date of Patent: Apr. 5, 2016

(54) COMMUNICATING DATA IN FLOWS BETWEEN FIRST AND SECOND COMPUTERS CONNECTED OVER A NETWORK

(75) Inventor: James M. King, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 922 days.

(21) Appl. No.: 13/142,721

(22) PCT Filed: Jan. 29, 2009

(86) PCT No.: PCT/US2009/032375
§ 371 (c)(1),
(2), (4) Date: Jun. 29, 2011

(87) PCT Pub. No.: WO2010/087828
PCT Pub. Date: Aug. 5, 2010

(65) Prior Publication Data
US 2011/0276715 A1    Nov. 10, 2011

(51) Int. Cl.
*G06F 15/16* (2006.01)
*H04L 29/06* (2006.01)

(52) U.S. Cl.
CPC ............ *H04L 65/4092* (2013.01); *H04L 65/80* (2013.01); *H04L 69/14* (2013.01)

(58) Field of Classification Search
USPC .......... 709/201–226, 235, 200; 715/707–726; 719/321
See application file for complete search history.

(56) References Cited

U.S. PATENT DOCUMENTS

| 6,895,588 B1* | 5/2005 | Ruberg ................. 719/321 |
| 2003/0147350 A1 | 8/2003 | Wookey et al. |
| 2006/0020702 A1* | 1/2006 | England et al. ........... 709/226 |
| 2007/0237077 A1 | 10/2007 | Patwardhan et al. |

FOREIGN PATENT DOCUMENTS

| CN | 1692585 | 11/2005 |
| CN | 1855890 | 11/2006 |
| CN | 1929478 | 3/2007 |

OTHER PUBLICATIONS

King, James M., "Notification of Transmittal of the International Search Report and the Written Opinion of the International Searching Authority, or the Declaration," dated Oct. 28, 2009, cited in PCT Priority Application Serial No. PCT/US2009/032375, 11 pages.

(Continued)

Primary Examiner — El Hadji Sall
(74) Attorney, Agent, or Firm — Trop Pruner & Hu P.C.

(57) ABSTRACT

A network arrangement includes a first computer connected over a network to a second computer. Data over plural flows is communicated over the network between the first computer and second computer, where the second computer has a resource remotely accessible by the first computer over the data network, and where the second computer has a device driver to receive user input at a user input device attached to the first computer. According to different priorities assigned to the corresponding plural flows, at least a first one of the plural flows of data is caused to be throttled such that at least a second one of the plural flows is provided a greater portion of a bandwidth of the network, where the second flow is used for communication of data related to remote access of the resource of the second computer by the first computer.

22 Claims, 2 Drawing Sheets

(56) References Cited

OTHER PUBLICATIONS

Brian Madden, Citrix MetaFrame XP: Advanced Technical Design Guide Including Feature Release 2; Auflage, Washington DC, BrianMadden.com Publishing, 2002, ISBN:0-9711510-3-2, 44 pages (2002).

P. Mehra, et al, Receiver-driven bandwidth sharing for TCP and its application to video streaming, IEEE Transactions on Multimedia, vol. 7; No. 4; pp. 740-752, Aug. 2005.

* cited by examiner

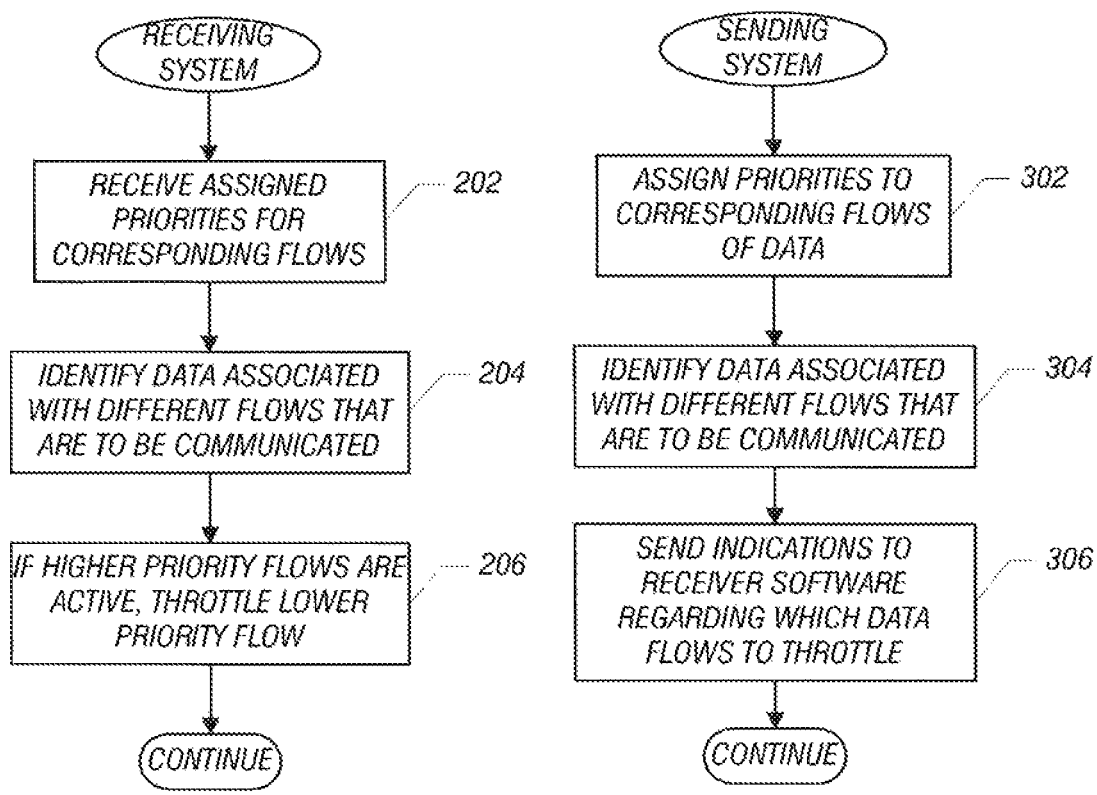

COMMUNICATING DATA IN FLOWS BETWEEN FIRST AND SECOND COMPUTERS CONNECTED OVER A NETWORK

CROSS-REFERENCE TO RELATED APPLICATION

This application is a national stage application under 35 U.S.C. §371 of PCT/US2009/032375, filed Jan. 29, 2009.

BACKGROUND

Many enterprises are transitioning to a network arrangement in which computing resources of central servers are provided to local computers at which users are located. The computing resources (e.g., software applications, processing resources, storage resources, etc.) that are centralized at one or more central servers can be selectively allocated to a session established by a user at a local computer.

Protocols are provided to enable a user at a local computer to access and share the desktop of a remote computer (e.g., a central server) over a computer network. One such protocol is the Remote Desktop Protocol (RDP), as provided by Microsoft Corporation, to provide remote display and input capabilities over network connections. Another protocol that can be used is the Remote Graphics Software (RGS) protocol from the Hewlett Packard Co. RGS is designed to take full advantage of the computer and graphics resources of a remote computer to deliver interactive remote access at the local computer. The desktop video data of the remote computer is transmitted over the network to the local computer, which displays the desktop video data locally in a window at the local computer. RGS is designed to provide fast capture, compression, and transmission of a desktop video data over a network. RGS also allows audio data to be sent from the remote computer to the local computer for output on an audio device of the local computer. RGS also captures user keyboard and mouse inputs at the local computer, and sends the keyboard and mouse inputs to the remote computer for processing by the operating system of the remote computer, and by applications running on the remote computer. RGS also allows data of other peripheral devices (e.g., such as storage devices) to be communicated from the local computer to the remote computer.

Certain peripheral devices such as storage devices (e.g., hard disk drives, optical disk drives, etc.) attached to the local computer are considered "bulk devices" since these devices can potentially transfer a relatively large volume of data ('bulk data') in a single transfer operation.

Transferring bulk data over the network from a local computer to a remote computer consumes a relatively large portion of the available bandwidth of the network between the local computer and remote computer. As a result, when a bulk data transfer operation is occurring, the amount of remaining network bandwidth available to sending video and/or audio data from the remote computer to the local computer is reduced, which may adversely affect the user experience in viewing video data or listening to audio data at the local computer.

BRIEF DESCRIPTION OF THE DRAWINGS

Some embodiments of the invention are (scribed, by way of example, with respect to the following figures:

FIG. 2 is a flow diagram of a process performed by a local computer of throttling a data flow over a network between the local computer and a remote computer, in accordance with an embodiment; and FIG. 3 is a flow diagram of a process performed by the remote computer of throttling a data flow over a network between the local computer and the remote computer, in accordance with another embodiment.

DETAILED DESCRIPTION

Figure 1:
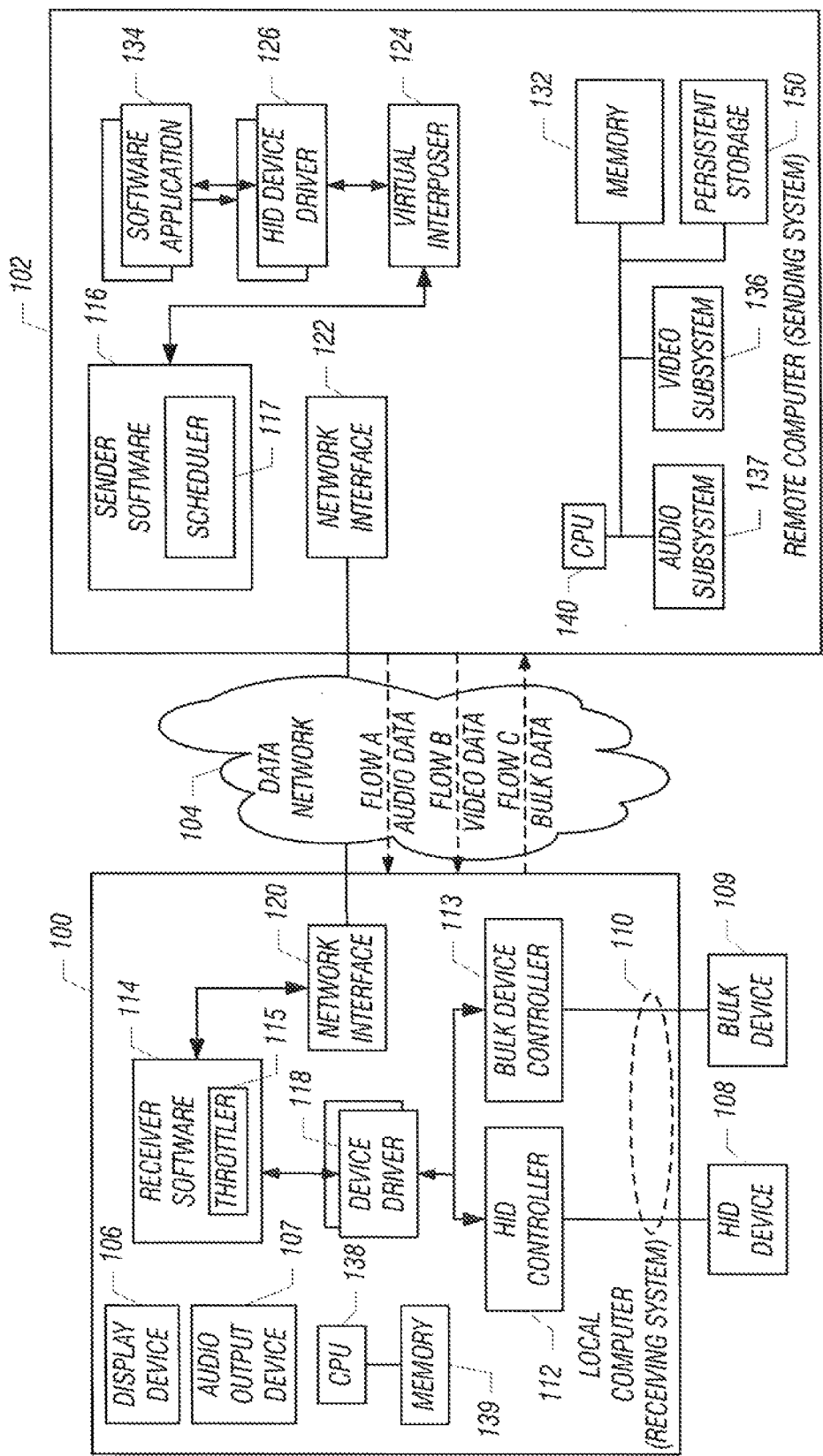
FIG. 1 is a block diagram of an exemplary arrangement that includes a local computer and remote computer, in which an embodiment of the invention can be incorporated.

FIG. 1 illustrates an arrangement in which a local computer 100 (at which a user is located) is connected to a remote computer 102 over a data network 104. Although just one local computer 100 and one remote computer 102 is depicted in FIG. 1, it is noted that there can be multiple local computers 100 and/or multiple remote computers 102.

The local computer 100 uses the resources of the remote computer 102 in sessions established between the local computer 100 and the remote computer 102. For example, the local computer 100 can use the graphics resources of the remote computer 102, in which the remote computer 102 delivers desktop video data of the remote computer over the network 104 to the local computer 100 for display in a display device 106 of the local computer 100. Also, the local computer can use audio resources of the remote computer 102, in which the remote computer 102 delivers audio data of the remote computer over the network 104 to the local computer 100 for output by an audio output device 107 (e.g., headphone, speakers, etc.) of the local computer 100.

Also, one or more user interface devices 108 are attached to the local computer 100. Changes in the state of the user interface device 108 are communicated from the local computer 100 over the data network 104 to the remote computer 102. The user interface device 108 can be a human interface device (HID) according to the HID standard, as described in Universal Serial Bus (USB), Device Class Definition For Human interface Devices (HID), Firmware Specification, Version 1.11, dated Jun. 27, 2001. The HID device 108 can be a mouse, a keyboard, a roller ball-type input device, a tablet, and so forth.

In addition one or more bulk devices 109 are attached to the local computer 100, A "bulk device" is a device that can potentially transfer a relatively large volume of data ('bulk data") in a single transfer operation from the local computer 100 to the remote computer 102 over the network 104. Examples of bulk devices include storage devices such as a hard disk drive, an optical disk drive, or any other type of storage device. A bulk device can also include an internal memory 139 of the local computer 100. An example scenario in which bulk data may be transferred from the internal memory 139 of the local computer 100 to the remote computer 102 is in the context of a cut-and-paste or copy-and-paste operation, in which a user may have selected a relatively large amount of data at the local computer to save into another application or document the cut or copied data is transferred from the internal memory 139 over the network 104 to the remote computer 102.

Transferring bulk data over the network 104 from the local computer 100 to the remote computer 102 consumes a relatively large portion of the available bandwidth of the network 104. As a result, when a bulk data transfer operation is occurring, the amount of remaining network bandwidth available to sending video and/or audio data from the remote computer 102 to the local computer 100 is reduced, which may adversely affect the user experience in viewing video data or listening to audio data at the local computer 100.

In accordance with some embodiments, a mechanism is provided to assign different priorities to different flows of data between the local computer 100 and remote computer 102. To improve user performance at the local computer 100 in obtaining data (e.g., viewing video data and/or listening to audio data) from the remote computer 102, the priority(ies) assigned to flows of video data and/or audio data from the remote computer 102 to the local computer 100 is (are) set higher than the priority assigned to the transfer of any bulk data from the bulk device 109 to the remote computer 102. A "flow" of data refers to a distinctly identifiable communication of data. The distinct flows of data can be flows associated with different applications (e.g. one flow to communicate video data for displaying video; another flow to communicate audio data for outputting audio; and a further flow to communicate bulk data; etc.).

In the example of FIG. 1, three flows of data are depicted: flow A (audio data from the remote computer 102 to the local computer 100); flow B (video data from the remote computer 102 to the local computer 100); and flow C (bulk data from the local computer 100 to the remote computer 102). There can be other flows between the local computer 100 and remote computer 102. Some or all of the flows can proceed concurrently.

In accordance with some embodiments, the priority assigned to flow C is lower than either of the priorities assigned to flows A and B, such that the audio and video data will be effectively allocated a greater portion of the bandwidth of the network 104 than the bulk data. In this way, if there is audio or video data to transmit, transmission of the bulk data in flow C is delayed until the audio or video data is sent in flow A or B. Allocation of priorities to the flows can be performed by a scheduler 117 in the remote computer 102.

The data network 104 can communicate data according to the Internet Protocol (IP). The HID device 108 and bulk device 109 can be attached to the local computer 100 over Universal Serial Bus (USB) link(s) 110 (wired or wireless USB link) to the local computer 100. The HID device 108 is connected to an HID controller 112, and the bulk device 109 is connected to a bulk device controller 113. In the above-described implementation, any data relating to the HID device 108 or bulk device 109 is in the form of USB data that is communicated in IP packets transferred over the data network 104 to the remote computer 102. Although reference is made to "USB" and "IP" in the embodiments described, it is noted that techniques according to some embodiments can be applicable to data packets according to other types of protocols.

The local computer 100 is referred to as a "receiving system," and the remote computer 102 is referred to as a "sending system." As such, the local computer 100 includes receiver software 114, and the remote computer 102 includes sender software 116. The sender software 116 is used for sending desktop video data and audio data of the remote computer 102 (sending system) over the data network 104 to the receiver software 114 in the local computer 100 (receiving system), where the desktop video data is displayed at the display device 106, and the audio data is output by the audio output device 107. Note that the desktop video data and audio data sent by the sender software 116 are actual rendering video data and rendering audio data that can be rendered by a respective display device and audio output device. The rendering video data and rendering audio data are different from data contained in source video files (e.g., MPEG files) or source audio files that have to be converted to a format that can be rendered by respective output devices.

The sender software 116 in the remote computer 102 receives video data from a video subsystem 136 in the remote computer 102. The video data of the video subsystem 136 is displayable by a display device attached to the remote computer 102. The sender software 116 then applies compression to the video data that is sent to the receiver software 114, which can then perform decompression of the video data before displaying the video data at the display device 106.

Similarly, the sender software 116 receives audio data from an audio subsystem 137 in the remote compute 102. The audio data of the audio subsystem 137 can be output by an audio output device attached to the remote computer 102. The sender software 116 also applies compression to the audio data that is sent to the receiver software 114, which can then perform decompression of the audio data before outputting the audio data at the audio output device 107.

Note that an actual display device or audio output device does not have to be connected to the video subsystem 136 or audio subsystem 137 of the remote computer 102 in some implementations; however, in other implementations, a display device or audio output device can be connected to the remote computer 102.

In some embodiments, the sender software 116 and receiver software 114 are according to the Remote Graphics Software (RGS) protocol from the Hewlett-Packard Co. RCS is designee to take full advantage of computer and graphics resources of a remote computer to deliver interactive remote access from a local computer. In a different embodiment, the sender software 116 and receiver software 114 can operate according to the Remote Desktop Protocol (RDP) from Microsoft Corporation, to provide remote display and input capabilities over network connections. In further embodiments, the sender software 116 and receiver software 114 can be according to other technologies.

Corresponding device drivers 118 in the local computer 100 interact with the HID controller 112 and bulk device 113 to perform operations with respect to the HID device 108 and bulk device 109, respectively. For example, a corresponding device driver 118 can receive indications of change of the HID device 108 (such as when a user has moved a mouse, actuated a keyboard, moved a roller ball-type input device, moved an input device relative to a tablet, and so forth). In addition, another device driver 118 can receive bulk data from the bulk device 109 for transmission over the network 104.

The receiver software 114 sends respective HID data and bulk data over the network 104 to the remote computer 102. In accordance with some embodiments, the receiver software 114 includes a throttler 115 to throttle the transmission of bulk data from the bulk device 109 over the network 104 if the throttler 115 detects that there are active flows of data (e.g., flow A and/or flow B) from the remote computer 102. "Throttling" a flow of data refers to slowing the rate of transmission of data in the flow, delaying the transmission of data in the flow, and/or stopping the transmission of data in the flow.

The flows of data between the local computer 100 and remote computer 102 occur through network interfaces 120 and 122. Each of the network interfaces 120 and 122 includes a physical network interface controller as well as a protocol stack, including an IP protocol stack. The network interface 120 sends USB data (bulk data and/or HID data) in respective IP packets over the data network 104 to the remote computer 102. The IP packets are received by a network interface 122 in the remote computer 102, which extracts the USB bulk data and/or HID data from the IP packets.

Bulk data received at the sender software 116 is forwarded to a virtual interposer 124, which can cause the received bulk data to be stored in the persistent storage 150 in the remote computer 102. The virtual interposer 124 intercepts calls from device drivers 126 in the remote computer 102 that are intended for remotely located peripheral devices, such as the bulk device 109 and the HID device 108 attached to the local computer 100. The virtual interposer 124 prevents calls to the remotely located peripheral devices from reaching lower level (kernel) device drivers of the operating system in the remote computer 102. Respective device drivers 126 can create audio data and video data that are provided to the audio subsystem 137 and video subsystem 136, respectively, to be rendered by respective output devices, such as respective output devices connected to the remote computer 100 and the remote computer 102. Also, another device driver 126 can receive updates regarding actuation (e.g., movement) of a user interface device such as the remotely located HID device 108.

The remote computer 102 also includes software applications 134. A corresponding software application 134 may have requested bulk data to be retrieved, from the bulk device 109 attached to the local computer 100. Another software application 134 may be waiting for updated information from the HID device 108.

In accordance with some embodiments, the sender software 116 includes the scheduler 117 that assigns priorities to the flows for communicating data between the local computer 100 and remote computer 102. The scheduler 117 can communicate the assigned priorities to the throttler 115, such that the throttler 115 can determine whether communication of bulk data is to be throttled when the throttler 115 detects that there are other flows of data between the local computer 100 and remote computer 102.

The local computer 100 includes one or more central processing units (CPUs) 138, which is connected to memory 139. The software modules of the local computer 100, such as the receiver software 114 and device driver 118, are executable on the CPU(s) 138.

The remote computer 102 similarly includes one or more CPUs 140 connected to memory 132 and persistent storage 150. The software modules of the remote computer 102, such as the software application 134, device driver 126, virtual interposer 124, and sender software 116 are executable on the CPU(s) 140.

FIG. 2 illustrates a procedure performed by a receiving system (local computer 100). The receiver software 114 in the local computer 100 receives (at 202) the assigned priorities for corresponding flows of data between the local computer 100 and the remote computer 102. For example, the flows of data can include flows A, B, and C depicted in FIG. 1. The assignment of priorities for corresponding flows of data can be performed by the scheduler 117 in the remote computer 102. After priorities have been assigned, the sender software 116 sends information relating to the assigned priorities to the receiver software 114.

Next, the receiver software 114 identifies (at 204) data associated with different flows that are to be communicated. If there exists data to communicate for a higher priority one or more flows (such as flows A and B in FIG. 1), then the throttler 115 in the local computer 100 throttles (a 206) a lower priority flow, such as flow C in FIG. 1 for sending bulk data from the local computer 100 to the remote computer 102.

FIG. 3 illustrates a procedure according to an alternative embodiment that is performed at the sending system (remote computer 102). The procedure of FIG. 3 can be performed in place of the procedure of FIG. 2.

The scheduler 117 in the remote computer 102 assigns (at 302) priorities to respective flows of data between the remote computer 102 and the local computer 100. The sender software 116 next identifies (at 304) data associated with different flows that are to be communicated. Based on the identified data, the sender software 116 sends (at 306) indications to the receiver software 114 in the local computer 100 to inform the receiver software 114 which flows of data to throttle, such as the local priority bulk data flow C in FIG. 1.

Instructions of software described above (including the receiver software 114, throttler 115, device drivers 118, sender software 116, scheduler 117, virtual interposer 124, and device drivers 126 of FIG. 1) are loaded for execution on a processor (such as one or more CPUs 139, 140 in FIG. 1). The processor includes microprocessors, microcontrollers, processor modules or subsystems (including one or more microprocessors or microcontrollers, or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a network arrangement including a first computer connected over a network to a second computer, comprising:

communicating data in plural flows over the network between the first computer and second computer, wherein the second computer has a resource remotely accessible by the first computer over the network, and wherein the second computer has a device driver to receive user input at a user input device attached to the first computer; and according to different priorities assigned to the corresponding plural flows, causing at least a first one of the plural flows of data to be throttled such that at least a second one of the plural flows is provided a greater portion of a bandwidth of the network, wherein the second flow is used for communication of data related to remote access of the resource of the second computer by the first computer.

2. The method of claim 1, wherein the resource of the second computer remotely accessed is an audio resource or a video resource, the method further comprising:
communicating audio data or video data in the second flow from the second computer to the first computer, wherein the audio data or video data is presented by an output device at the first computer.

3. The method of claim 2, further comprising:
communicating data of a peripheral device attached to the first computer in the first flow from the first computer to the second computer.

4. The method of claim 3, wherein communicating the data of the peripheral device comprises communicating the data of a data storage device.

5. The method of claim 3, wherein communicating the data of the peripheral device comprises communicating Universal Serial Bus (USB) data of the peripheral device.

6. The method of claim 2, further comprising:
communicating data associated with a cut-and-paste or copy-and-paste operation performed at the first computer in the first flow from the first computer to the second computer.

7. The method of claim 2, further comprising communicating data associated with the user interface device from the first computer to the device driver of the second computer.

8. The method of claim 7, wherein communicating the audio data or video data comprises communicating the audio data or video data of an audio subsystem or video subsystem of the second computer, wherein the audio data or video data is created by a device driver of the second computer.

9. The method of claim 1, wherein the communicating and causing steps are performed by the second computer, the method further comprising:
a scheduler in the second computer assigning different priorities to the plural flows of data.

10. The method of claim 1, wherein the communicating and causing steps are performed by either the first or second computer.

11. A first computer comprising:
a processor;
sender software executable on the processor to send, over a network, at least one of audio data and video data to a second computer for output by an output device attached to the second computer, and to receive data relating to a user interface device attached to the second computer; and
a scheduler executable on the processor to assign different priorities to flows of data between the first computer and the second computer, wherein the flows of data include at least one flow for communicating the at least one of audio data and video data, and a second flow for communicating data of a peripheral device attached to the second computer over the network to the first computer,
wherein the sender software is to provide an indication to the second computer to cause the second computer to throttle communication of the data in the second flow.

12. The first computer of claim 11, wherein the peripheral device is a bulk device for communicating bulk data.

13. The first computer of claim 11, further comprising:
a device driver; and
a virtual interposer to intercept a call made by the device driver to access the peripheral device attached to the second computer.

14. The first computer of claim 11, wherein the data of the peripheral device comprises Universal Serial Bus (USB) data.

15. An article comprising at least one non-transitory computer-readable storage medium containing instructions that when executed cause a first computer to:
send, over a network, at least one of audio data and video data to a second computer for output by an output device attached to the second computer;
receive, at a device driver in the first computer, data relating to a user interface device attached to the second computer;
assign different priorities to flows of data between the first computer and the second computer, wherein the flows of data include at least one flow for communicating the at least one of audio data and video data, and a second flow for communicating data of a peripheral device attached to the second computer over the network to the first computer; and
provide an indication to the second computer to cause the second computer to throttle communication of the data in the second flow.

16. The method of claim 1, wherein the communicating and the causing are performed at the first computer, the method further comprising:
receiving by the first computer, the assigned different priorities from the second computer.

17. The method of claim 16, further comprising receiving, by the first computer from the second computer, information identifying the first flow to be throttled.

18. The first computer of claim 11, wherein the scheduler is executable on the processor to communicate the assigned priorities to the first computer.

19. The first computer of claim 18, wherein the indication provided to the second computer identifies the second flow to be throttled.

20. The first computer of line 11, further comprising a device driver to receive user input at the user interface device attached to the second computer.

21. The article of claim 15, wherein the instructions when executed cause the first computer to further send the assigned priorities to the second computer.

22. The article of claim 21, wherein the indication provided to the second computer identifies the second flow to be throttled.

* * * * *